United States Patent Office 3,470,389
Patented Sept. 30, 1969

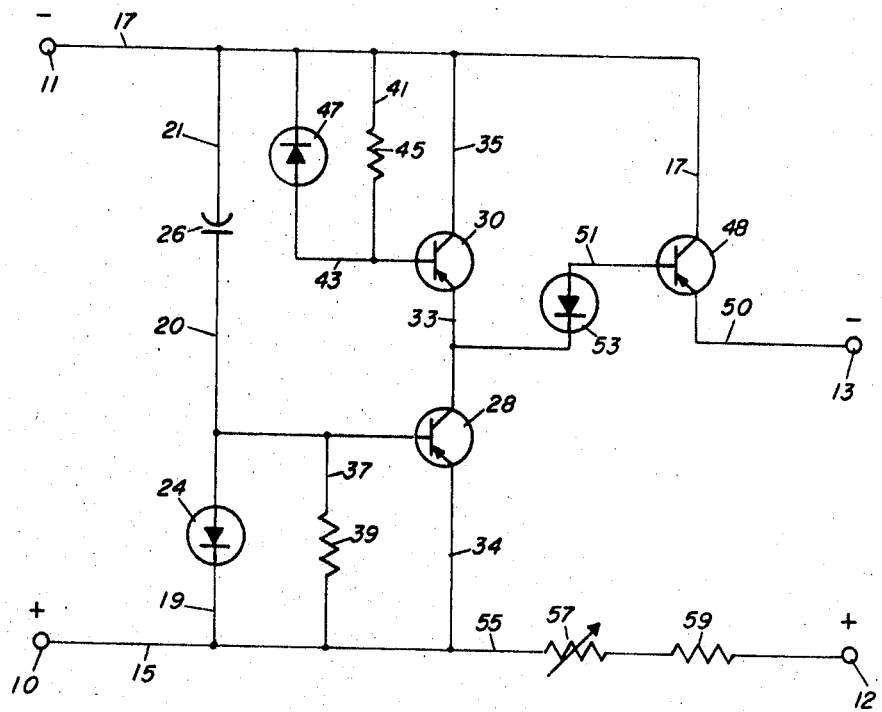

3,470,389
SELF-POWERED TRANSISTORIZED METER
CLAMP CIRCUIT FOR EXTRANEOUS
PULSES
Ben J. Vaandering, 1514 NE. 60th St.,
Vancouver, Wash. 98665
Filed Oct. 18, 1966, Ser. No. 588,250
Int. Cl. H03k 17/30
U.S. Cl. 307—237
4 Claims

ABSTRACT OF THE DISCLOSURE

Spurious pulses are screened out of a meter input through a circuit having in leads connected across input terminals thereof, a capacitor which responds to a spurious input pulse by momentarily switching into effect a diode and resistance combined in parallel to absorb the resultant extraneous current and facilitate the gating of steady input to the meter.

---

The invention herein described and claimed may be manufactured and used by or for the Government of the United States of America for governmental purposes without the payment of royalties thereon or therefor.

The invention relates to a clamp circuit adapted to improve the operation of an indicating or recording instrument measuring electrical quantities and energies. When this circuit is connected to transmit an input to the instrument, it functions to temporarily reject or suppress those extraneous or spurious pulses tending to distort such input, whereby the indication or recording of erroneous pulses is prevented, and more reliable and meaningful instrument readings are attainable.

More specifically, the invention is constituted by a simplified transistorized circuit wherein series connected resistance-capacitance components are receptive to extraneous pulses in signals supplied as an input to a metering instrument, and in response thereto switch the conductive state of a transistor which controls the circuit to maintain momentarily unchanged the then existent input condition in the instrument. However, any detectable electrical quantity change in the supplied input having significant duration becomes ineffective to continue the pulse suppression function of the circuit, such that the input in the instrument is allowed to reach a new condition reflecting the sustained change. This invention is particularly useful where the quantity being measured is in terms of radio signal strength, radio interference noise, or radio influence voltage, which at any time can be disturbed by extraneous pulses generated by nearby or remote equipment such as motors, relays, switches, auto ignition, or even by parts within the associated recording equipment.

Accordingly, it is an object of this invention to provide a novel circuit for reliably and economically transmitting to a metering instrument a current input free from the effect of extraneous or spurious pulses having been a part thereof.

A further objective of the invention is to provide a normally passive current monitoring and controlling instrument which is made operative by extraneous or spurious pulses in a quantity of electrical input to a metering instrument to temporarily retain the value of the current measurable as input during the time such pulses occur.

These and other objects of the invention will more fully appear from the following detailed description when read in connection with the accompanying drawing wherein the single figure is a schematic wiring diagram of one form of a circuit embodying the invention.

Referring to the figure of the drawing, the circuit components of the present invention are shown arranged and interconnected between input terminals 10 and 11 through which the electrical quantity to be measured is supplied to the circuitry, and output terminals 12 and 13 through which the electrical quantity passes from the circuitry to a measuring or indicating instrument. Input terminals 10 and 11 have connections made thereto by way of leads 15 and 17, respectively, between which a circuit comprising leads 19, 20, and 21 serially connect a diode 24 and a capacitor 26. A further circuit arrangement between leads 15 and 17 includes two PNP type transistors 28 and 30, a lead 33 joining the collector of transistor 28 to the emitter of transistor 30, and leads 34 and 35 which connect the emitter of transistor 28 to lead 15, and the collector of transistor 30 to lead 17, respectively. The base of transistor 28 is joined to terminal lead 15 by way of a lead 37 and a parallel circuit connected thereto including a resistor 39 and a diode 24. The base of transistor 30 is joined to terminal lead 17 by way of a parallel circuit including leads 41 and 43 having connected therein a resistor 45 and a diode 47, respectively. A third PNP-type transistor 48 of this circuitry has its collector connected to the extended end of terminal lead 17, and the emitter thereof connected by way of lead 50 to output terminal 13. The base of transistor 48 is joined to lead 33 between transistors 28 and 30 by way of a lead 51 having a diode 53 connected therein. A further lead 55 is provided to connect lead 34 from the transistor 28 emitter, and terminal lead 15 to output terminal 12 by way of an adjustable resistor 57 in series with a fixed resistor 59.

Exemplary of inputs which can be supplied to terminals 10 and 11 are radio interference voltages emanating from corona discharge of high voltage power lines. These electrical quantities are normally broad-band radio frequency voltages which are detected for measurement by the receiving antenna of a radio noise meter and expressed in terms of microvolts per meter of antenna length. Such quantities are first precisely amplified and then transmitted to indicating or recording meters in terms of equivalent milliamperes. The invention is accommodated to the meters by detaching the usual electrical meter leads from the meter and connecting them to terminals 10 and 11. Terminals 12 and 13 then serve as a source of signals for the meter and accordingly are attached to the meter or recorder with proper regard for polarity at all terminals. Appropriate connections for proper polarity are designated at the terminals shown in the figure of the drawing, and all references to relative potential differences disclosed hereinafter are to be considered as taken with respect to the positive potential at input terminal 10. Operation of the invention is initiated by providing a known input to the instrument antenna circuit and resistor 57 is adjusted to restore the meter or recorder to its original equivalent milliampere indication.

For the steady state condition, when the current passing through to the meter connected to output terminals 12 and 13 is constant or slow changing, transistor 28 is non-conducting while transistor 48 is relatively saturated by reason of the biasing current passing through diode 53 and transistor 30. Although the saturation resistance of transistor 48 is in series with the resistance in the meter across terminals 12 and 13, it is sufficiently low as to not affect the total resistance of the meter circuit. More specifically, if it is assumed that the steady-state condition produces a significant positive potential difference between terminals 10 and 11, the electrodes of capacitor 26 are equally charged and no current flows through resistor 39 by way of the circuit comprising leads 21, 20, and 37. Since the potential difference at the base of transistor 28 is thus maintained at a relatively small negative value, which is insufficient to cause the transistor to conduct, no current flows through the emitter circuit of the transistor to its lead 34. Therefore the current induced by the significant potential at the input terminals must flow to the emitter of transistor 48 through lead 55, resistors 57 and 59, and the meter by way of output terminals 12 and 13. Further, a relatively high negative potential is then available at the base of transistor 30 by way of lead 17, diode 47, resistor 45 and lead 43 whereby transistor 30 conducts sufficiently so as to cause a a relatively high negative potential at its emitter and lead 33. Consequently transistor 48 becomes relatively saturated because of the relatively high negative potential provided at its base by way of diode 53 and lead 51, and conducts the major portion of the meter current through lead 17 to terminal 11.

In retrospect, all meter current flows from terminal 10, through leads 15, 55, resistors 57 and 59, the meter by way of terminals 12 and 13, lead 50, transistor 48 and lead 17 to terminal 11, excepting a small biasing current from the base of transistor 48 through diode 53, transistor 30 and lead 35, and correspondingly smaller current from the base of transistor 30 through resistor 45 and diode 47. The total resistance significant to the operation of the meter is the sum of resistor 57, as adjusted, resistor 59, the meter resistance, and the dynamic forward resistance of transistor 48.

Upon the occurrence of a relatively high positive potential difference step increase across terminal 10 and 11, a corresponding difference in potential appears at the electrodes of capacitor 26, causing it to draw current through resistor 39, lead 37, and lead 20. A substantial negative potential then appears at the base of transistor 28 causing it to conduct sharply and pass current to the emitter of transistor 30. However, because of the uniquely peculiar nonlinear resistance function of a diode and resistor in parallel, transistor 30, through resistor 45 and diode 47 can absorb the additional current with only incremental changes of potential at its emitter and lead 33, and correspondingly incremental changes at the base of transistor 48 through 53. Consequently, even though the collector potential of transistor 48 at lead 17 changes radically, its base potential at lead 51 changes insignificantly, so as to cause little or no change in its current conducting status. Therefore, it is evident that the increase in current induced by the momentary step increase in potential at terminals 10 and 11 flows through lead 34, transistor 28, lead 33, transistor 30, and lead 35. A small portion of that current flows through the base of transistor 30, lead 43, diode 47, and resistor 45 for self-biasing.

In the steady-state condition transistor 48 is biased on through diode 53, transistor 30, and lead 35. Transistor 30 is inturn biased on by the parallel arrangement of resistor 45 and diode 47. The basic base resistance for transistor 48 is then the dynamic forward resistance of diode 53 and transistor 30. The dynamic forward resistance of transistor 30 is, in turn, established by the fixed resistance of resistor 45 and the dynamic forward resistance of diode 47. The dynamic forward resistance of diode 47 decreases with increasing potential and increases with decreasing potential, creating when in parallel with resistor 45 a nonlinear base resistance function for transistor 30. The value of resistor 45 should be selected to properly bias transistor 30, which in turn properly biases transistor 48 for the entire range of a given meter.

Further consideration must be given to the selection of a value for resistor 45 in that when a momentary step increase occurs, transistor 28 will pass current to transistor 30. Transistor 30 must be able to, through its base resistance of the combination of diode 47 and resistor 45, accept this changing condition without significantly affecting its forward dynamic resistance, thereby maintaining a stable bias condition for transistor 48. If too high a value were chosen the dynamic resistance of transistor 30 will increase sharply, thereby causing transistor 48 to become momentarily less saturated, in turn causing a decrease in meter current flow; and, if too low, the dynamic resistance of transistor 30 will decrease, causing transistor 48 to become more saturated and losing its effectiveness for pulse rejection by immediately creating more meter current flow. The optimum value for resistor 45 is then in the area where maximum pulse rejection and minimum inverse action is obtained. Once selected for a given meter, or circuit components, of external circuit conditions, it will need no further attention.

In the event there is a persistent potential increase condition, the relative increase in meter current value will depend on the abruptness of the potential increase. If the time of the increase is equal to or more than the time constant of capacitor 26 and resistor 39, then the increase in meter current will vary proportionately to the potential increase; and, if more abrupt, the circuit will seek to reject or "clamp," as previously explained, and then gradually increase as the capacitor 26 electrodes gain equilibrium potential.

Assuming a step decrease in potential between terminals 10 and 11, the collapse of potential at capacitor 26 electrodes will cause a reverse current to flow through lead 20, diode 24, and lead 19; as well as through lead 37 and resistor 39. Because the forward dynamic resistance of diode 24 is much less than that of resistor 39, the capacitor will discharge quickly. The reversal of current causes a small potential reversal at the emitter-base junction of transistor 28 through its base connection to leads 20 and 37. This small reversed potential serves as a back-bias to positively hold transistor 28 in a nonconducting state, allowing stored circuit energies to be dissipated through lead 21, capacitor 26, and diode 24 almost instantly. Hence the meter indication will decrease almost as rapidly as the potential at terminals 10 and 11 decreases. Although this can be a desired effect in the use of the circuit, the removal of diode 24 from the circuit would increase the discharge time of capacitor 26 through the higher resistance of resistor 39, resulting in a much slower dissipation of stored energies and a correspondingly slower decrease in meter indication. Thus, the circuit can be used to "clamp" step decreases as well as step increases.

Accordingly, the initial adjustments required to adapt the invention to a particular metering instrument are: (a) select a value for capacitor 26 and resistor 39 suitable for the needs, having consideration for the magnitude and time duration of the spurious pulses expected; (b) consider original meter resistance and full deflection current and adjust resistor 57 accordingly; (c) select optimum value of resistor 45; and (d) test under actual or simulated operating conditions and reselect components, if required, to obtain the desired effect.

An exemplary form of the invention following the circuit shown in the drawing, and having components as hereinafter designated, is capable when applied to a typical meter rated at 1 ma. and 1500 ohms of suppressing pulses having individual or successively combined pulse widths up to 1.5 seconds.

| | | |
|---|---|---|
| Transistors 28, 30 and 48 | | 2N485 |
| Diodes 24, 47, and 53 | | SD93A |
| Capacitor 26 | mfd | 50 |
| Variable resistor 57 | ohms | 1K |
| Resistor 45 | do | 8.2K |
| Resistor 59 | do | 330 |
| Resistor 39 | do | 22K |

Since the pulse suppression period is determined by the time constant of resistor 39 and capacitor 26, it may be adjusted to a desired value for the particular type of instrument or device on which the clamp circuit is to be used. Adjustments of variable resistor 57 in an obvious manner, accomplishes the necessary matching of the circuit impedance to that of the particular instrument or device and the source of the electrical quantity being measured. Resistor 59 functions as a current limiter which avoids a burn out current should resistor 57 be set to its minimum resistance, and should have a rating to accommodate the particular elements and components present in the circuit.

The meter clamp circuit of the present invention is powered entirely by the electrical quantity being measured and does not need a separate power source. However, this electrical quantity is in no way altered thereby since for the steady-state condition the transistors are in a passive state and require no power, and when these transistors are in an active state the power is being furnished by the pulse the circuit seeks to reject.

It should be evident from the above description of the invention that it constitutes a simple and economical construction having no moving parts, and is operative without a separate external power supply. Only initial adjustments are needed since all components can be derated to non-critical values.

While a preferred embodiment of the invention has been described and illustrated, it is to be understood that the invention is not limited thereby but is susceptible to change in form and detail.

What is claimed is:

1. A circuit regulating current characteristics of an electrical quantity subject to random spurious pulses and which is supplied as input to a device intended in accordance with normal variations in said input, said regulating circuit having input terminals receiving said electrical quantity from a source, output terminals through which said regulated electrical quantity is applied to said device, gating circuitry comprising a transistor switch connected to said input and output terminals by way of said device and operative when biased by a predetermined voltage at the base thereof to maintain effective a current path between said input and output terminals and through said device, intermediate circuitry connected across said input terminals and comprising a current control circuit connected to said transistor switch and operable to supply said predetermined bias voltage to said transistor switch so as to enable said gating circuitry, a current diverting circuit comprising said current control circuit and bridging circuit connections extending between said input and output terminals, and a further circuit connected across said input terminals and made operable to initiate operation of said current diverting circuit in response to a spurious pulse received at said input terminals whereby said further circuit operates to produce a potential which effects operation of said current diverting circuit for a limited time during which a current due to said spurious pulse is shunted before reaching said output terminals and extraneous current absorbed in said current control circuit so as to temporarily maintain substantially unchanged said electrical quantity applied to said device.

2. The circuit of claim 1 wherein said transistor switch has the emitter-collector circuit thereof in first circuit leads joining one of said output terminals to one of said input terminals, said current control circuit comprising a diode and a further transistor having the emitter-collector circuit thereof connected between said transistor switch base by way of said diode and said first circuit leads, said current diverting circuit comprising a still further transistor having the collector-emitter circuit thereof connected between said further transistor emitter and second circuit leads joining the other of said input terminal of said input terminals, and said current control circuit further comprising a resistance compensator arrangement connected to the base of said further transistor and to said first circuit leads, and said further circuit comprising third circuit leads connected across said first and second circuit leads and having serially connected therein a capacitor and a parallel circuit including a further diode and a resistance, said still further transistor having the base thereof connected to said parallel circuit at the capacitor connection thereto, whereby a spurious pulse across said input terminals produces by action of said capacitor in said third circuit leads a momentary current which in passing through said parallel circuit connected therein biases said still further transistor to conduct momentarily and pass current from said input terminals through said further transistor wherefrom said current is absorbed by action of said resistance compensator arrangement connected to the base thereof, while said further transistor functions to operatively maintain said transistor switch in condition to gate into said device an input unaffected by said spurious pulse.

3. The circuit of claim 2 wherein said compensator arrangement comprises a still further diode and a further resistance connected in a parallel circuit extending between said first circuit leads and the base of said further transistor.

4. The circuit of claim 2 wherein said second circuit leads have serially connected therein adjustable and fixed resistances whereby the impedance of said circuit can be appropriately matched to that of said device.

References Cited

UNITED STATES PATENTS 3,153,729 10/1964 Leaky _____ 307—254 X
3,308,309 3/1964 Wichmann _____ 307—237

DONALD D. FORRER, Primary Examiner

R. C. WOODBRIDGE, Assistant Examiner

U.S. Cl. X.R.

324—119; 325—380; 328—100; 307—202, 297